United States Patent
Nammi et al.

(10) Patent No.: US 10,834,748 B2
(45) Date of Patent: Nov. 10, 2020

(54) INDICATION OF ADDITIONAL INFORMATION IN 5G SYSTEMS WITH LEGACY DOWNLINK CONTROL CHANNEL

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 161 days.

(21) Appl. No.: 16/057,371

(22) Filed: Aug. 7, 2018

(65) Prior Publication Data

US 2019/0349975 A1  Nov. 14, 2019

Related U.S. Application Data

(60) Provisional application No. 62/670,167, filed on May 11, 2018.

(51) Int. Cl.
*H04W 72/12* (2009.01)
*H04L 1/00* (2006.01)
*H04W 88/02* (2009.01)

(52) U.S. Cl.
CPC ........ *H04W 72/1289* (2013.01); *H04L 1/0058* (2013.01); *H04W 88/02* (2013.01)

(58) Field of Classification Search
CPC .............. H04W 72/1289; H04W 88/02; H04L 1/0058; H04L 1/0031; H04L 1/1822; H04L 1/0061; H04L 1/1887; H04L 1/1812; H04L 1/1845; H04L 2001/0092; H04L 2001/0097
See application file for complete search history.

(56) References Cited

U.S. PATENT DOCUMENTS

| 7,263,088 | B2 | 8/2007 | Bui |
| 8,189,615 | B2 | 5/2012 | Malkamaki et al. |
| 8,411,627 | B2 | 4/2013 | Grovlen et al. |
| 8,630,276 | B2 | 1/2014 | Seo et al. |

(Continued)

FOREIGN PATENT DOCUMENTS

| WO | 2012039556 A2 | 3/2012 |
| WO | 2017131870 A1 | 8/2017 |

OTHER PUBLICATIONS

Sun, et al., A novel design of downlink control information encoding and decoding based on polar codes, Wireless Communications and Mobile Computing, May 13, 2018, 8 pages, vol. 2018.

(Continued)

*Primary Examiner* — Jung Liu
(74) *Attorney, Agent, or Firm* — Amin, Turocy & Watson, LLP

(57) ABSTRACT

Indication of additional information in 5G systems with a legacy downlink control channel is provided. A method can include receiving, by a device comprising a processor, a scheduling parameter via a message that was transmitted via a downlink control channel by a network device, determining that the scheduling parameter is associated with a non-self-decodable transport block, and, in response to the determining, identifying the scheduling parameter as information distinct from scheduling information for the non-self-decodable transport block.

20 Claims, 12 Drawing Sheets

(56) References Cited

U.S. PATENT DOCUMENTS

| | | |
|---|---|---|
| 8,873,489 B2 | 10/2014 | Liao et al. |
| 8,902,845 B2 | 12/2014 | Kakishima et al. |
| 8,935,588 B2 | 1/2015 | Michel et al. |
| 9,001,768 B2 | 4/2015 | Lee et al. |
| 9,059,822 B2 | 6/2015 | Frenne et al. |
| 9,295,053 B2 | 3/2016 | Wengerter et al. |
| 9,357,541 B2 | 5/2016 | Moulsley et al. |
| 9,439,212 B2 | 9/2016 | Damnjanovic et al. |
| 9,474,059 B2 | 10/2016 | Seo et al. |
| 9,591,628 B2 | 3/2017 | Miki et al. |
| 9,807,788 B2 | 10/2017 | Wengerter |
| 9,923,684 B2 | 3/2018 | Ng et al. |
| 2005/0100085 A1* | 5/2005 | Dottling ............... H04L 1/0041 375/240 |
| 2008/0298387 A1* | 12/2008 | Lohr ................... H04L 1/1671 370/467 |
| 2010/0098006 A1* | 4/2010 | Golitschek Edler Von Elbwart ............ H04L 1/1861 370/329 |
| 2011/0019776 A1 | 1/2011 | Zhang et al. |
| 2011/0194504 A1 | 8/2011 | Gorokhov et al. |
| 2011/0223924 A1* | 9/2011 | Lohr ................... H04W 72/042 455/450 |
| 2011/0305213 A1* | 12/2011 | Lohr ................... H04L 1/1887 370/329 |
| 2012/0002568 A1* | 1/2012 | Tiirola ................. H04L 1/0026 370/252 |
| 2017/0079025 A1 | 3/2017 | Jiang et al. |
| 2017/0150486 A1 | 5/2017 | Ang et al. |
| 2017/0171850 A1 | 6/2017 | Ang et al. |
| 2017/0318478 A1* | 11/2017 | Basu Mallick ....... H04L 5/0069 |
| 2018/0048421 A1 | 2/2018 | Yeo et al. |
| 2018/0098349 A1 | 4/2018 | Sun et al. |
| 2018/0124753 A1 | 5/2018 | Sun et al. |

OTHER PUBLICATIONS

Maunder, et al., Complementary turbo and LDPC codes for NR, motivated by a survey of over 100 ASICs, Oct. 14, 2016, 15 Pages.

Wu, et al., A New Downlink Control Channel Scheme for LTE, IEE, Jun. 2013, 7 Pages.

Hosein, Resource Allocation for the LTE Physical Downlink Control Channel, Nov. 2009, 6 Pages.

LTE, LTE Sidelink Resource Pools and PSCCH Period, May 22, 2018, 20 Pages.

* cited by examiner

… (1)

INDICATION OF ADDITIONAL INFORMATION IN 5G SYSTEMS WITH LEGACY DOWNLINK CONTROL CHANNEL

CROSS-REFERENCE TO RELATED APPLICATIONS

The present application claims the benefit of priority to U.S. Provisional Patent Application No. 62/670,167, filed May 11, 2018, and entitled "INDICATION OF ADDITIONAL INFORMATION IN 5G SYSTEMS WITH LEGACY DOWNLINK CONTROL CHANNEL," the entirety of which application is incorporated herein by reference.

TECHNICAL FIELD

The present disclosure relates to wireless communication systems, and, in particular, to techniques for indicating information in fifth-generation (5G) wireless communication systems.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include receiving, by a device including a processor, a scheduling parameter via a message that was transmitted via a downlink control channel by a network device. The method can further include determining, by the device, that the scheduling parameter is associated with a non-self-decodable transport block. In response to the determining, the method can also include identifying, by the device, the scheduling parameter as information distinct from scheduling information for the non-self-decodable transport block.

In another aspect, a system as described herein can include a processor and a memory that stores executable instructions that, when executed by the processor, facilitate performance of operations. The operations can include receiving a scheduling parameter via a message that was transmitted via a downlink control channel by a network device; determining that the scheduling parameter is associated with a non-self-decodable transport block; and, in response to the determining, identifying the scheduling parameter as information other than scheduling information for the non-self-decodable transport block.

In a further aspect, a machine-readable storage medium as described herein can include executable instructions that, when executed by a processor, facilitate performance of operations. The operations can include receiving a scheduling parameter via a message that was transmitted via a downlink control channel by a network device and, in response to determining that the scheduling parameter is associated with a non-self-decodable transport block, identifying the scheduling parameter as information that is not scheduling information for the non-self-decodable transport block.

Figure 1:
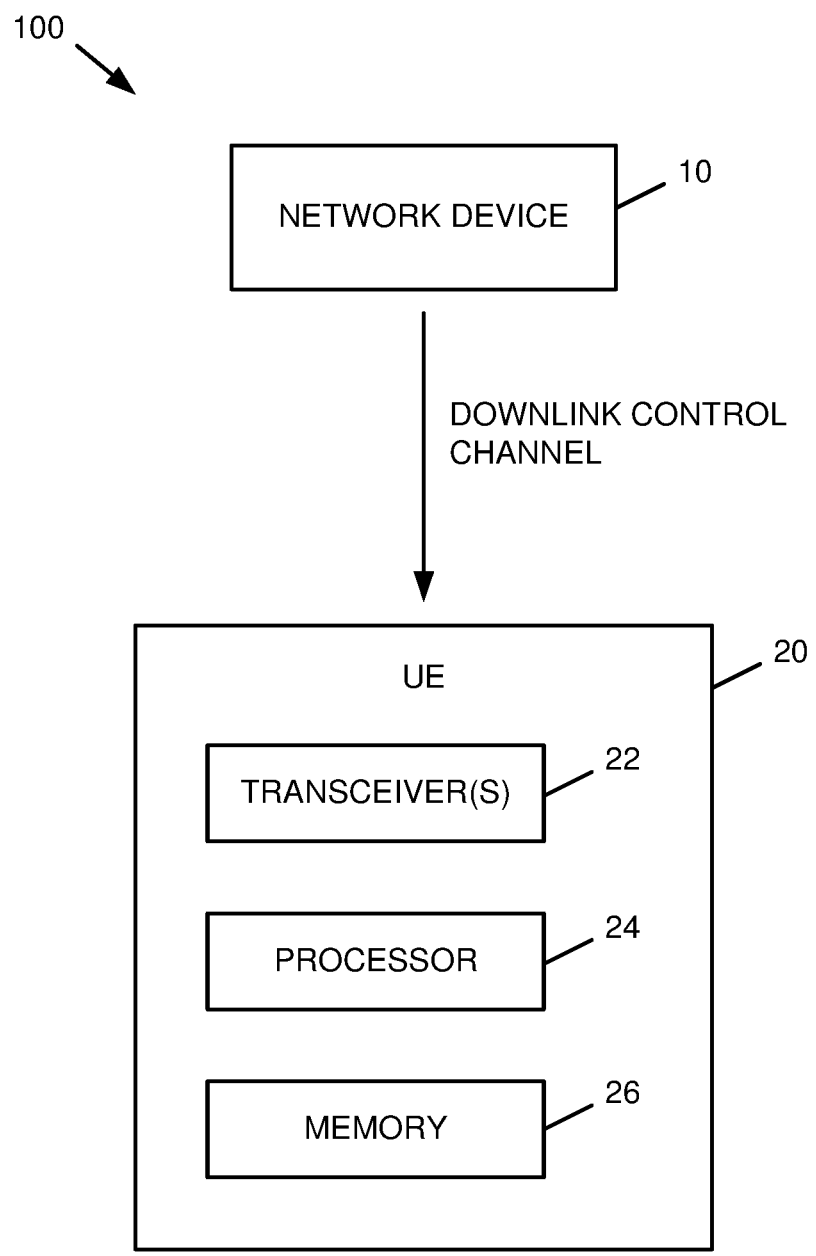
FIG. 1 is a block diagram of a system that facilitates indication of additional information in 5G systems via a legacy downlink control channel in accordance with various aspects described herein.

Referring first to FIG. 1, a system 100 that facilitates indication of additional information in 5G systems via a legacy downlink control channel is illustrated. System 100 as shown by FIG. 1 includes a network device 10 (e.g., an access point (AP), a Node B (NB), etc.), which can communicate with one or more user equipment devices (UEs) 20. Collectively, the network device 10 and UE 20 can form at least a portion of a wireless communication system. While only one network device 10 and one UE 20 are illustrated in FIG. 1 for simplicity of illustration, it should be appreciated that a wireless communication network can include any number of UEs, APs, and/or other network devices.

In an aspect, information can be communicated between the network device 10 and the UE 20 via respective wireless channels, which can be classified as uplink or downlink channels as well as data channels or control channels. An uplink channel refers to a channel utilized for communication from the UE 20 to the network device 10, while a downlink channel refers to a channel utilizes for communication from the network device 10 to the UE. Additionally, a data channel refers to a wireless channel that is utilized to carry data (e.g., voice, video, text, etc.) between devices in system 100, and a control channel refers to a wireless channel that is utilized to transmit information relating to the operation of system 100.

The UE 20 shown in system 100 can include one or more transceivers 22 that can receive messages that are transmitted by the network device 10 via a downlink channel, e.g., a downlink control channel or a downlink data channel. The transceiver 22 can include respective antennas and/or any other hardware or software components (e.g., an encoder/ decoder, modulator/demodulator, etc.) that can be utilized to process signals for transmission and/or reception by the UE 20. An example of a coding chain that can be utilized by the transceiver 22 is described in further detail below with respect to FIG. 3.

In an aspect, the UE 20 can further include a processor 24 and a memory 26, which can be utilized to facilitate various functions of the UE 20. For instance, the memory 26 can include a non-transitory computer readable storage medium that contains computer executable instructions, and the processor 24 can execute instructions stored by the memory 26.

In an aspect, the processor 24 and memory 26 can be utilized to process a scheduling parameter or other information transmitted by the network device 10 via a downlink control channel. By way of example, the processor 24 can determine that a scheduling parameter transmitted by the network device 10 indicates and/or is otherwise associated with a non-self-decodable transport block. In response to this determination, the processor 24 can further identify the scheduling parameter as information distinct from scheduling information for the non-self-decodable transport block. In this manner, signaling efficiency associated with system 100 can be increased by utilizing otherwise unused radio resources to indicate useful information from the network device 10 to the UE 20.

The following description is intended to provide a general overview of 5G networks in order to foster a basic understanding of various embodiments described herein. It should be appreciated, however, that various aspects of the subject matter described and claimed herein could be utilized in other wireless networks in addition to, or in place of, 5G networks. Unless explicitly stated otherwise, no part of this description is intended to limit the scope of the embodiments described herein to a specific network standard or set of standards.

5G Introduction

In order to meet the growing demand for data centric applications, currently the Third Generation Partnership Project (3GPP) is extending the fourth-generation (4G) wireless standards to 5G, also known as New Radio (NR) access. A non-exhaustive list of objectives for 5G networks is as follows:

1) Supported data rates of several tens of megabits per second for large numbers of users, e.g., tens of thousands of users.

2) Network speeds of approximately 1 gigabit/second to be offered simultaneously to groups of workers on the same office floor or other area.

3) Large numbers of supported simultaneous connections, e.g., several hundreds of thousands of simultaneous connections, for massive sensor deployments and/or other uses.

4) Enhanced spectral efficiency as compared to 4G.

5) Improved coverage.

6) Enhanced signaling efficiency.

7) Reduced latency as compared to LTE (Long Term Evolution).

In addition to the above, other objectives could also be considered.

Additionally, multiple-input multiple-output (MIMO) systems can be utilized to increase the data carrying capacity of wireless systems. For this reason, MIMO is utilized in both the third and fourth generation wireless systems. 5G systems can also employ MIMO in a form known as massive MIMO (e.g., using hundreds of antennas at the transmitter side and/or receiver side). In a ($N_t$, $N_r$) system, where $N_t$ denotes the number of transmit antennas and $N_r$ denotes the number of receive antennas, the peak data rate of the system can multiply with a factor of $N_t$ over single antenna systems in a rich scattering environment.

Message Sequence Chart for Downlink Data Transfer

Figure 2:
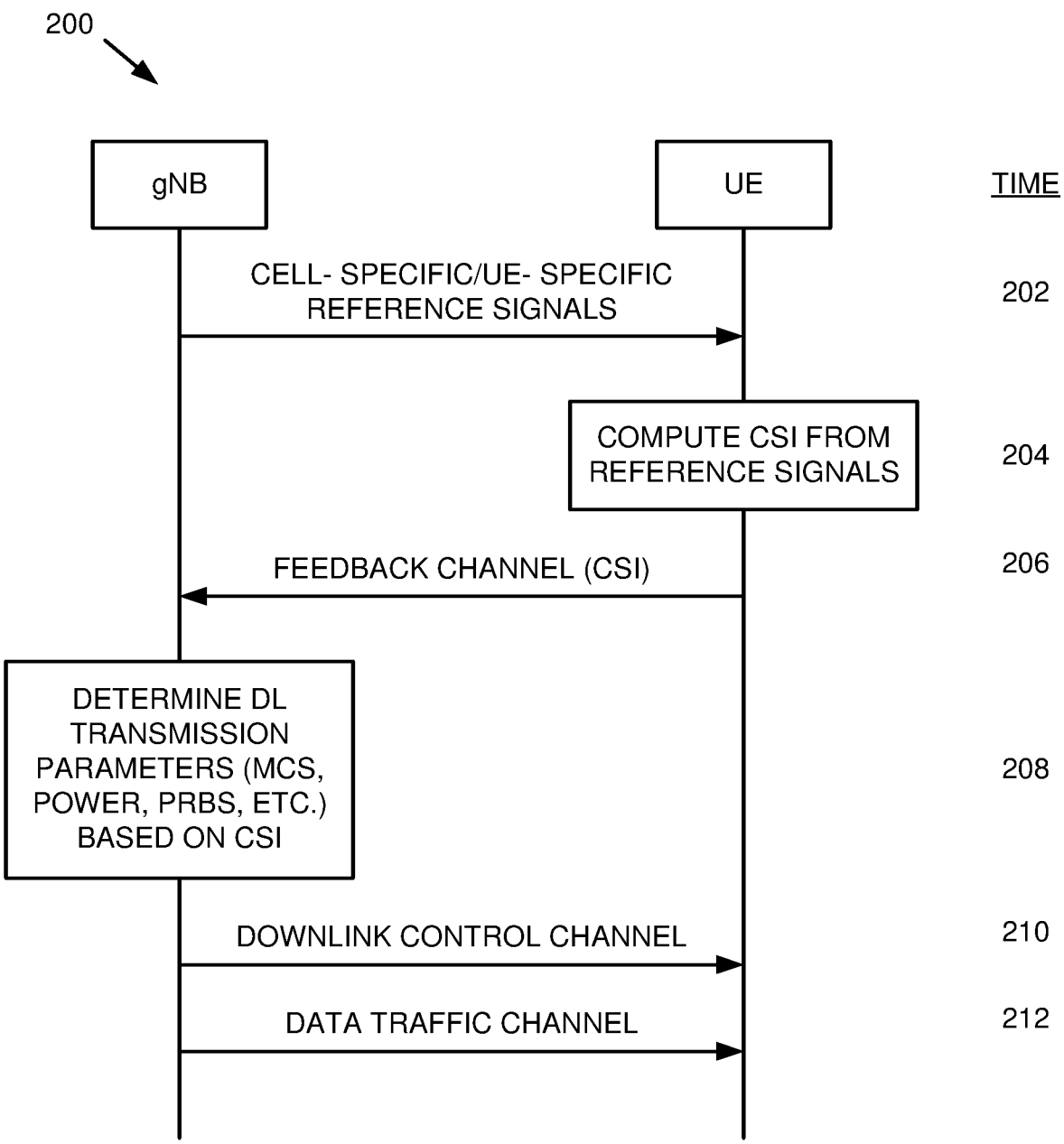
FIG. 2 depicts an example message sequence between a network and a UE (user equipment) in accordance with various aspects described herein.

Diagram 200 in FIG. 2 shows an example message sequence chart for downlink data transfer in 5G systems between a General Node B (gNB), e.g., the network device 10 shown in FIG. 1, and a UE, e.g., the UE 20 shown in FIG. 1. At time 202, the gNB can transmit cell-specific and/or UE-specific pilot or reference signals. From the pilot or reference signals, the UE can compute the channel estimates and subsequently compute the parameters associated with channel state information (CSI) reporting at time 204. The UE can then provide a CSI report to the gNB via a feedback channel at time 206. The CSI report can include, e.g., channel quality indicator (CQI), preceding matrix index (PMI), rank information (RI), CSI-RS Resource Indicator (CRI), and/or other channel quality parameters.

The CSI report can be sent to the network via a feedback channel, either aperiodically on request from the network or periodically according to a configured reporting schedule. The network scheduler can use this information in choosing the parameters for scheduling of the corresponding UE at time 208. The network can send the scheduling parameters to the UE in the downlink control channel at time 210, and data transfer can subsequently take place from the network to the UE at time 212.

Downlink Reference Signals

Downlink reference signals are predefined signals that can occupy specific resource elements within the downlink time-frequency grid. There are several types of downlink reference signals that are transmitted in different ways and used for different purposes by the receiving terminal. A non-exhaustive list of such signals are as follows:

CSI reference signals (CSI-RS): These reference signals can be used by terminals to acquire channel-state information (CSI) and beam specific information (beam RSRP or reference signal received power). As CSI-RS is UE specific in 5G networks, this signal can have a lower time/frequency density as compared to other networks.

Demodulation reference signals (DM-RS): These reference signals, also sometimes referred to as UE-specific reference signals, can be used by terminals for channel estimation associated with a data channel. The label "UE-specific" is used to indicate that each demodulation reference signal can be intended for channel estimation by a single terminal. A given reference signal is then only transmitted within the resource blocks assigned for data traffic channel transmission to the corresponding terminal.

Other reference signals can be used in addition to, or in place of, the signals listed above. For instance, phase tracking, sounding reference signals, and/or other signals could also be used.

Uplink Control Channel

The uplink control channel can carry information relating to Hybrid Automatic Repeat Request (HARQ) Acknowledgement (ACK) information corresponding to a downlink data transmission as well as channel state information. The channel state information can include CRI (channel state information reference signal (CSI-RS) resource indicator), RI (rank indicator), CQI (channel quality indicator), PMI (precoding matrix indicator), Layer Indicator, and/or other information. In an example, the CSI can be divided into two categories, one for sub band and the other for wideband. The configuration of sub band or wideband CSI reporting can be done through radio resource control (RRC) signaling as part of the CSI reporting configuration. Table 1 shows the contents of an example CSI report for PMI format indicator=Wideband, CQI format indicator=Wideband as well as for PMI format indicator=Sub band, CQI format indicator=Sub band.

TABLE 1

Contents of CSI report for wideband and sub band.

| PMI-FormatIndicator = widebandPMI and CQI-FormatIndicator = widebandCQI | | PMI-FormatIndicator = subbandPMI or CQI-FormatIndicator = subbandCQI | |
|---|---|---|---|
| | CSI Part I | CSI Part II | |
| | | wideband | sub band |
| CRI | CRI | Wideband CRI for the second TB | Sub band differential CQI for the second TB of all even sub bands |
| Rank Indicator | Rank Indicator | PMI wideband (X1 and X2) | PMI sub band information fields $X_2$ of all even sub bands |
| Layer Indicator | Layer Indicator | — | Sub band differential CQI for the second TB of all odd sub bands |
| PMI wideband (X1 and X2) | Wideband CQI | — | PMI sub band information fields $X_2$ of all odd sub bands |
| Wideband CQI | Sub band differential CQI for the first TB | — | — |

For NR, the sub band can be defined according to the bandwidth part of the orthogonal frequency division multiplexing (OFDM) in terms of physical resource blocks (PRBs) as shown in Table 2. The sub band configuration can also be done through RRC signaling.

TABLE 2

Configurable sub band sizes.

| Carrier bandwidth part (PRBs) | Sub band Size (PRBs) |
|---|---|
| <24 | N/A |
| 24-72 | 4, 8 |
| 73-144 | 8, 16 |
| 145-275 | 16, 32 |

Downlink Control Channel (DCI)

The downlink control channel (PDCCH) can carry information relating to scheduling grants. This information can include the number of MIMO layers scheduled, transport block sizes, modulation for respective codewords, parameters related to HARQ, sub band locations, etc. It should be appreciated that not all downlink channel information (DCI) formats may transmit all of the information as given above. In general, the contents of PDCCH can be based on transmission mode and DCI format.

In an aspect, a non-exhaustive list of information that can be transmitted by means of DCI is as follows:
1) Carrier indicator
2) Identifier for DCI formats
3) Bandwidth part indicator
4) Frequency domain resource assignment
5) Time domain resource assignment
6) VRB (virtual resource block)-to-PRB (physical resource block) mapping flag
7) PRB bundling size indicator
8) Rate matching indicator
9) ZP (zero power) CSI-RS trigger
10) Modulation and coding scheme for respective TBs (transport blocks)
11) New data indicator (NDI) for respective TBs
12) Redundancy version (RV) for respective TBs
13) HARQ process number
14) Downlink Assignment Index
15) TPC (transmit power control) command for uplink control channel
16) PUCCH (uplink control channel) resource indicator
17) PDSCH (downlink shared channel)-to-HARQ feedback timing indicator
18) Antenna port(s)
19) Transmission configuration indication
20) SRS (sounding reference signal) request
21) CBG (code block group) transmission information
22) CBG flushing out information
23) DMRS (demodulation reference signal) sequence initialization In addition to the above, other information could also be transmitted.

Coding Chain for PDSCH

Figure 3:
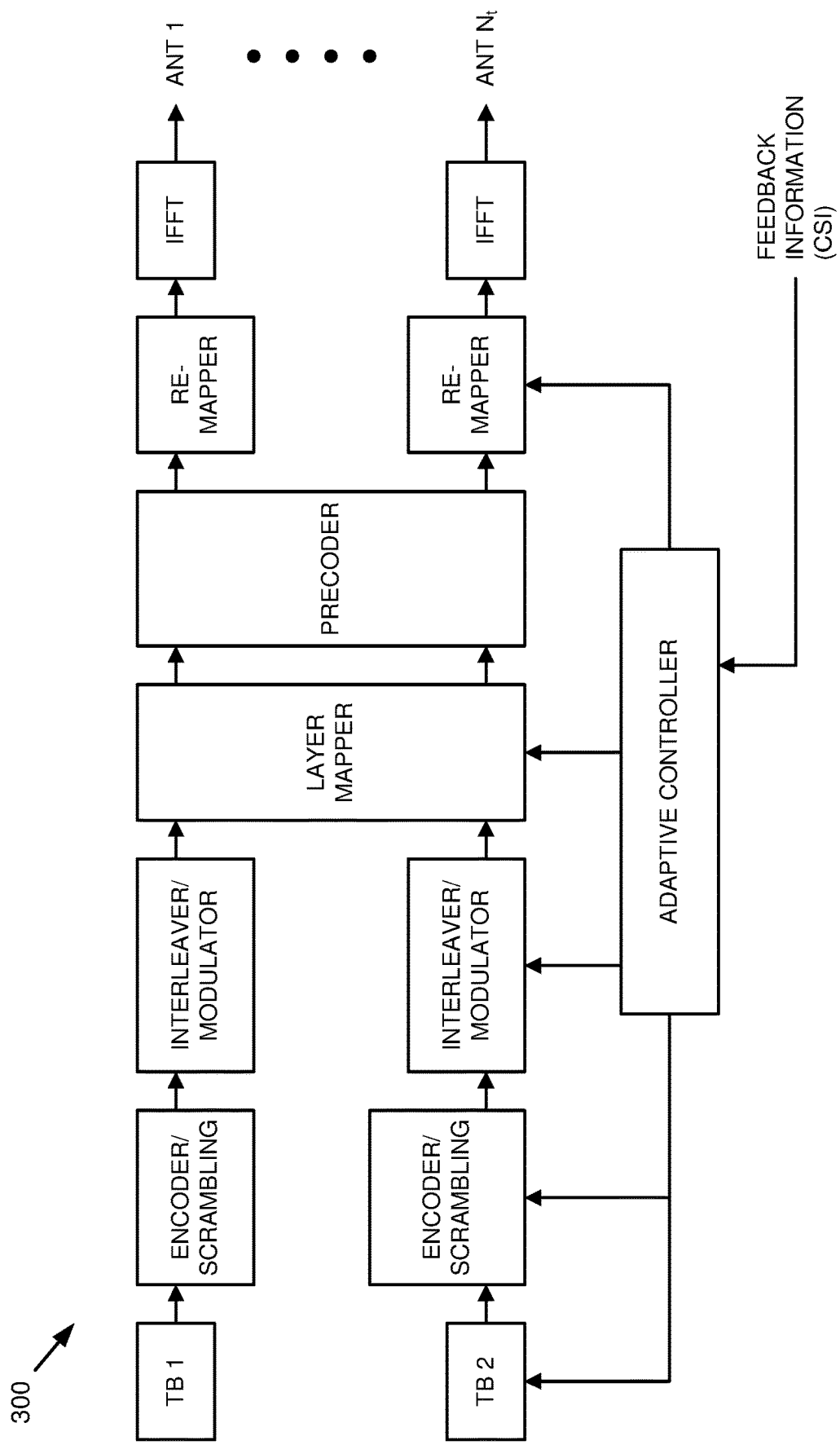
FIG. 3 depicts an example coding chain for a downlink transmitter in accordance with various aspects described herein.

Diagram 300 in FIG. 3 shows the transmission side of a MIMO communication system with $N_t$ transmit antennas. In an aspect, there can be up to 2 transport blocks. For instance, the number of transport blocks can be equal to 1 when the number of layers is less than or equal to 4, and 2 transport blocks can be transmitted if the number of layers is more than 4. The cyclic redundancy check (CRC) bits can be added to respective transport blocks and passed to the channel encoder. Low density parity check (LDPC) codes can be used as the forward error correction (FEC) for NR. The channel encoder can also add parity bits to protect the data.

After encoding, the data stream can be scrambled with user-specific scrambling and the stream can be passed through an interleaver. The interleaver size can be adaptively controlled by puncturing to increase the data rate. The adaptation can be done by using the information from the feedback channel, for example channel state information sent by the receiver. The interleaved data can be passed through a symbol mapper (modulator), which can be controlled by the adaptive controller.

After processing by the modulator, the streams can be passed through a layer mapper and the precoder. The resultant symbols can be mapped to the resources elements in the time-frequency grid of OFDM. The resultant streams can then be passed through an inverse fast Fourier transform (IFFT) block. In an aspect, the IFFT block can be used in communication systems that implement orthogonal frequency division multiple access (OFDMA) as the access technology, e.g., 5G, LTE/LTE-A, etc. In other systems, use of the IFFT block can be dependent on the multiple access system used. Subsequently, the encoded stream can be transmitted through the respective antenna.

Figure 4:
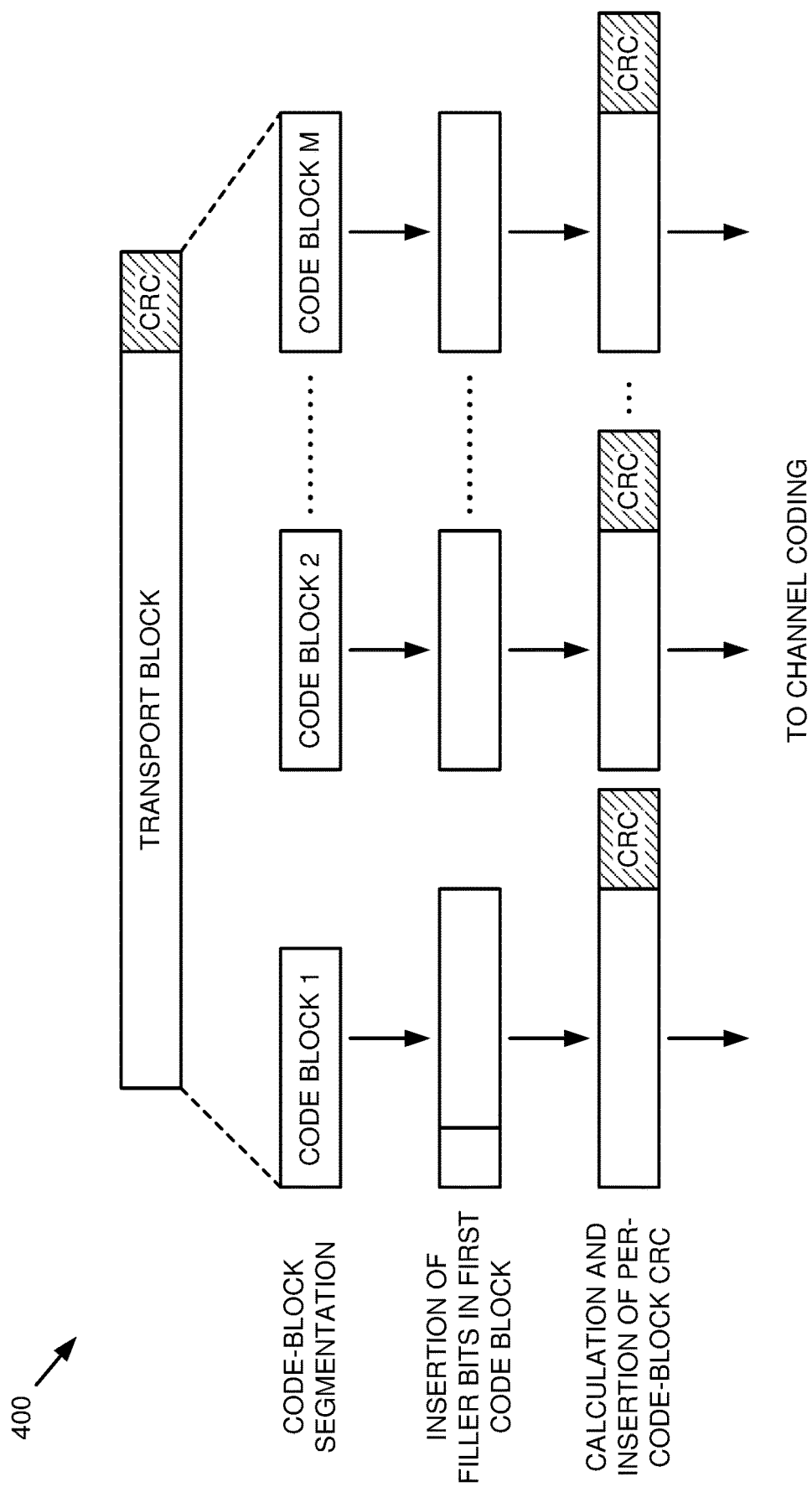
FIG. 4 depicts an example code block segmentation scheme that can be utilized in accordance with various aspects described herein.

Code Block Segmentation:

In NR, for data transmission, the transport block can be encoded using low-density parity check (LDPC) code. In the first step of the physical-layer processing, a 24-bit CRC can be calculated for and appended to respective transport blocks. The CRC can enable receiver-side detection of errors in the decoded transport block. The corresponding error indication can, for example, be used by the downlink HARQ protocol as a trigger for requesting retransmissions. If the transport block, including the transport-block CRC, exceeds the maximum code-block size (e.g., 8448 for base graph 1 and 3840 for base graph 2), code-block segmentation can be applied before the LDPC coding as shown by diagram 400 in FIG. 4. In code-block segmentation, the transport block can be segmented into smaller code blocks, the sizes of which can match the set of code-block sizes supported by the LDPC coder.

In the case of a single code block where no segmentation is needed, additional code-block CRC can be omitted. Alternatively, code-block segmentation can be applied to large transport blocks for which the relative extra overhead due to the additional transport block CRC is small. Information relating to transport-block size can be provided to the terminal as part of the scheduling assignment transmitted on the PDCCH control channel. Based on this information, the terminal can determine the code-block size and number of code blocks. The terminal receiver can thus, based on the information provided in the scheduling assignment, straightforwardly undo or assemble the code-block segmentation and recover the decoded transport blocks.

Figure 5:
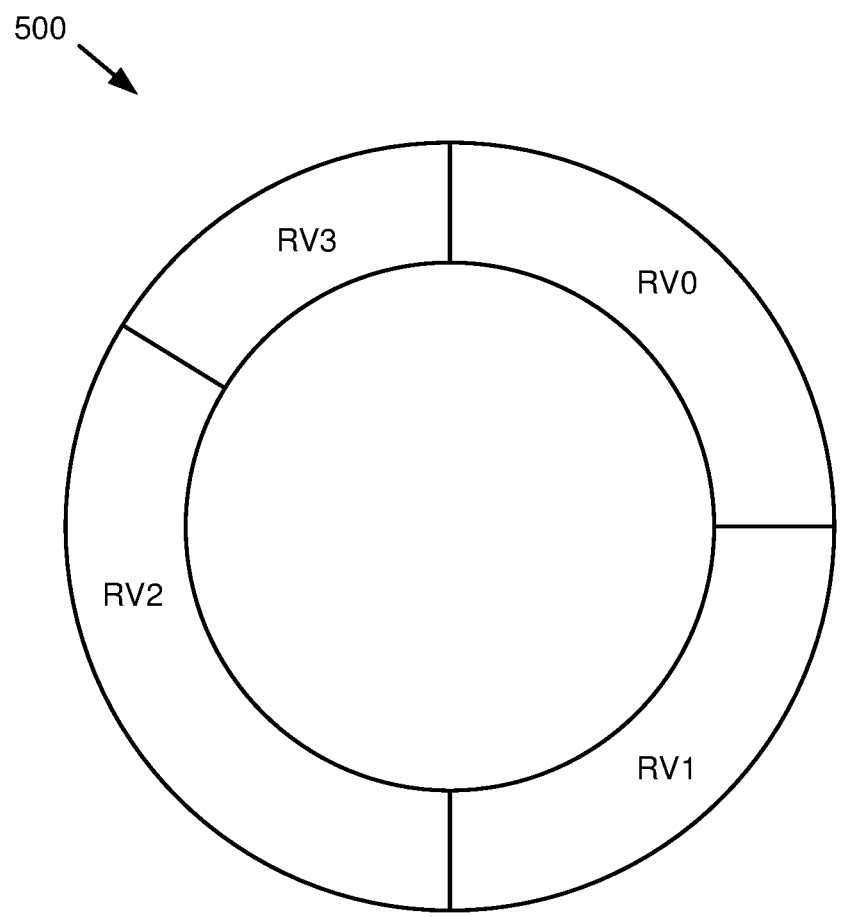
FIG. 5 depicts an example circular buffer for redundancy versions that can be utilized in accordance with various aspects described herein.

Redundancy Version:

Once the information bits are segmented and encoded using LDPC code (e.g., according to either base graph 1 or 2), they can be rate matched for the transmission. NR can use a circular buffer for rate matching each code block. As an example, 4 redundancy versions can be used, as shown in graphical form by diagram 500 in FIG. 5. The starting positions of each redundancy version in FIG. 5 is shown in Table 3.

TABLE 3

Starting position of different redundancy versions, $k_0$.

| $rv_{id}$ | Base graph 1 | Base graph 2 |
|---|---|---|
| 0 | 0 | 0 |
| 1 | $\left\lfloor \frac{17N_{cb}}{66Z_c} \right\rfloor Z_c$ | $\left\lfloor \frac{13N_{cb}}{50Z_c} \right\rfloor Z_c$ |
| 2 | $\left\lfloor \frac{33N_{cb}}{66Z_c} \right\rfloor Z_c$ | $\left\lfloor \frac{25N_{cb}}{50Z_c} \right\rfloor Z_c$ |
| 3 | $\left\lfloor \frac{56N_{cb}}{66Z_c} \right\rfloor Z_c$ | $\left\lfloor \frac{43N_{cb}}{50Z_c} \right\rfloor Z_c$ |

In NR, for each transmission, the network can inform the UE which redundancy version it is currently scheduling. This can be communicated via the downlink control channel for PDSCH transmission and via the downlink control channel (grant channel) for uplink data transmission.

Self-Decodable Redundancy Versions:

In an aspect, some versions of the LDPC codes designed for 5G wireless communications are self-decodable. As used herein, "self-decodability" refers to a redundancy version for which, if the version is used for one or all re-transmissions, the decoder is able to decode the transport block. Simulation results for various redundancy versions are as follows:

Redundancy version 0 (RV0) is self-decodable for any code rates and modulation schemes.

Redundancy version 1 (RV1) is self-decodable for low code rates (e.g., up to 0.45) and any modulation schemes.

Redundancy version 2 (RV2) is self-decodable for low code rates (e.g., up to 0.5) and any modulation schemes.

Redundancy version 3 (RV3) is self-decodable for any code rates and modulation schemes.

In an aspect, because a NR UE cannot decode network-scheduled information relating to certain combinations of modulation, coding scheme, redundancy version and new data indicator, these fields are unused and do not carry any information. As a result, the downlink control channel is unused whenever the network schedules this information. This in turn reduces the overall capacity as the power allocated for PDSCH is not useful. In addition, the resources used for PDCCH cannot be used for PDSCH. Accordingly, mechanisms for utilizing the contents of DCI are desirable.

Various aspects herein relate to an efficient mechanism for indicating information from the network to the UE by using an unused combination of modulation, redundancy version and NDI, thereby increasing the efficiency of the existing DCI. In summary, the properties of LDPC codes can be used to choose a non-self-decodable combination of modulation and coding scheme to indicate some useful information to the UE. Various embodiments to achieve the foregoing and related ends are provided herein. These can include, but are not limited to, the following:

1) A method to indicate the useful information using a non-self-decodable combination of LDPC.

2) A method at the receiver to decode the downlink control channel and derive the scheduling parameters for decoding PDSCH.

3) A method at the receiver node to decode PDSCH from the obtained information from the downlink control channel.

By utilizing the techniques described herein, various advantages can be achieved. For instance, techniques provided herein can avoid overhead by using some unused combination of DCI fields to indicate useful information to the UE. This can, in turn, improve the link and system throughput for 5G systems. Other advantages are also possible.

While various aspects herein are described in the context of downlink data transmission for MIMO systems, it should be appreciated that similar principles are applicable for uplink and side link systems.

The terms "radio network node," "network node," or "gNB" are used herein to refer to any type of network node that serves a UE and/or is connected to any other network node, network element, and/or radio node from which a UE can receive a signal. Examples of radio network nodes are a Node B, base station (BS), multi-standard radio (MSR) node such as MSR BS, gNB, eNode B, network controller, radio network controller (RNC), base station controller (BSC), relay, donor node controlling relay, base transceiver station (BTS), access point (AP), transmission points, transmission nodes, RRU (remote radio unit), RRH (remote radio head), nodes in distributed antenna system (DAS), etc.

Similarly, the term "UE" as used herein refers to any type of wireless device that can communicate with a radio network node in a cellular or mobile communication system. Examples of a UE include a target device, device to device (D2D) UE, machine type UE or UE capable of machine to machine (M2M) communication, PDA, Tablet, mobile terminals, smart phone, laptop embedded equipment (LEE), laptop mounted equipment (LME), USB dongles, etc.

The embodiments provided herein can be applicable to single carrier as well as multicarrier (MC) or carrier aggregation (CA) operation of the UE in conjunction with MIMO, in which the UE is able to receive and/or transmit data to more than one serving cell using MIMO. The term carrier aggregation (CA) is also called (e.g., interchangeably called) "multi-carrier system," "multi-cell operation," "multi-carrier operation," "multi-carrier transmission," "multi-carrier reception," etc.

Further, while various aspects herein are described in the context of PDSCH transmission from a single transmission/reception point (TRP), it can be appreciated that similar principles can be applied for PDSCH transmission from multiple TRPs.

Operating Principle

Figure 6:
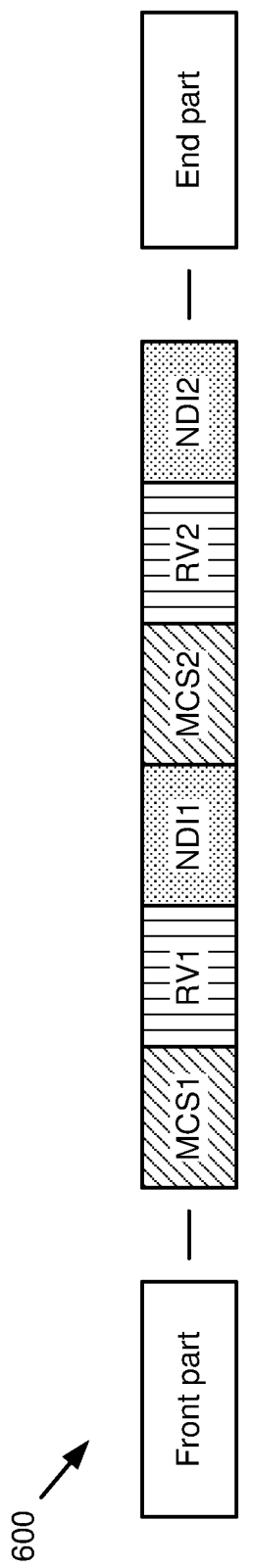
FIG. 6 depicts an example downlink control channel structure that can be employed in accordance with various aspects described herein.

Diagram 600 in FIG. 6 shows an example DCI structure for multi-codeword MIMO in NR. As can be seen from diagram 600, the control channel can include a front part, which can contain resource allocation information for the frequency and time domain, and an end part, which can contain HARQ process identifiers. Other information can also be carried via the front part and/or the end part. In between the front and end parts, the control channel can include modulation/coding scheme (MCS), redundancy version (RV), and new data indicator (NDI) for each codeword/transport block. When the number of layers is greater than 4, NR can utilize two codewords. Accordingly, any of the entries of the MCS index table in Table 4 below can be used to indicate the MCS of each codeword if the MCS table for the UE is configured with maximum modulation of 64 QAM (quadrature amplitude modulation). If the MCS of the UE is configured to have maximum modulation of 256 QAM, then any one of the entries in Table 5 below can be used to indicate the MCS of each codeword. Here, the RV for each codeword can take the values 0, 1, 2, or 3. Other RV schemes could also be used. Additionally, the NDI value of each codeword can be toggled for a new transmission.

In an aspect, the properties of LDPC code can be leveraged to indicate useful information to the UE. This can, for instance, increase resource efficiency of the system since an initial transmission cannot use a non-self-decodable LDPC combination. In an aspect, the useful information can be understood by the network and the UE. This can be achieved via a predefined set of definitions, e.g., as provided by a communications standard, and/or in any other sufficient way to ensure that the network and UE have mutual knowledge of the purposes of respective combinations.

As noted above with regard to an NR LDPC code for an initial transmission, RV can be either 0 or 3 for all for all code rates if the network controls self-decodability. Thus, if the network chooses a code rate of greater than 0.5, the RV is equal to 1 or 2 and the NDI is equal to 1/0 (e.g., a new transmission), this can indicate to the UE that the network is communicating useful information to the UE.

By way of example, if the network sends for the second codeword shown by diagram 600 parameters of MCS2>5, RV2=1 or 2, and NDI2=1/0 (e.g., toggled from the previous HARQ process number), this can serve as an indication to the UE that the network is sending useful information to the UE.

TABLE 4

MCS index table 1 for PDSCH.

| MCS Index $I_{MCS}$ | Modulation Order $Q_m$ | Target code Rate x [1024] R | Spectral efficiency |
|---|---|---|---|
| 0 | 2 | 120 | 0.2344 |
| 1 | 2 | 157 | 0.3066 |

TABLE 4-continued

MCS index table 1 for PDSCH.

| MCS Index $I_{MCS}$ | Modulation Order $Q_m$ | Target code Rate x [1024] R | Spectral efficiency |
|---|---|---|---|
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 5

MCS index table 2 for PDSCH.

| MCS Index $I_{MCS}$ | Modulation Order $Q_m$ | Target code Rate x [1024] R | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

Figure 7:
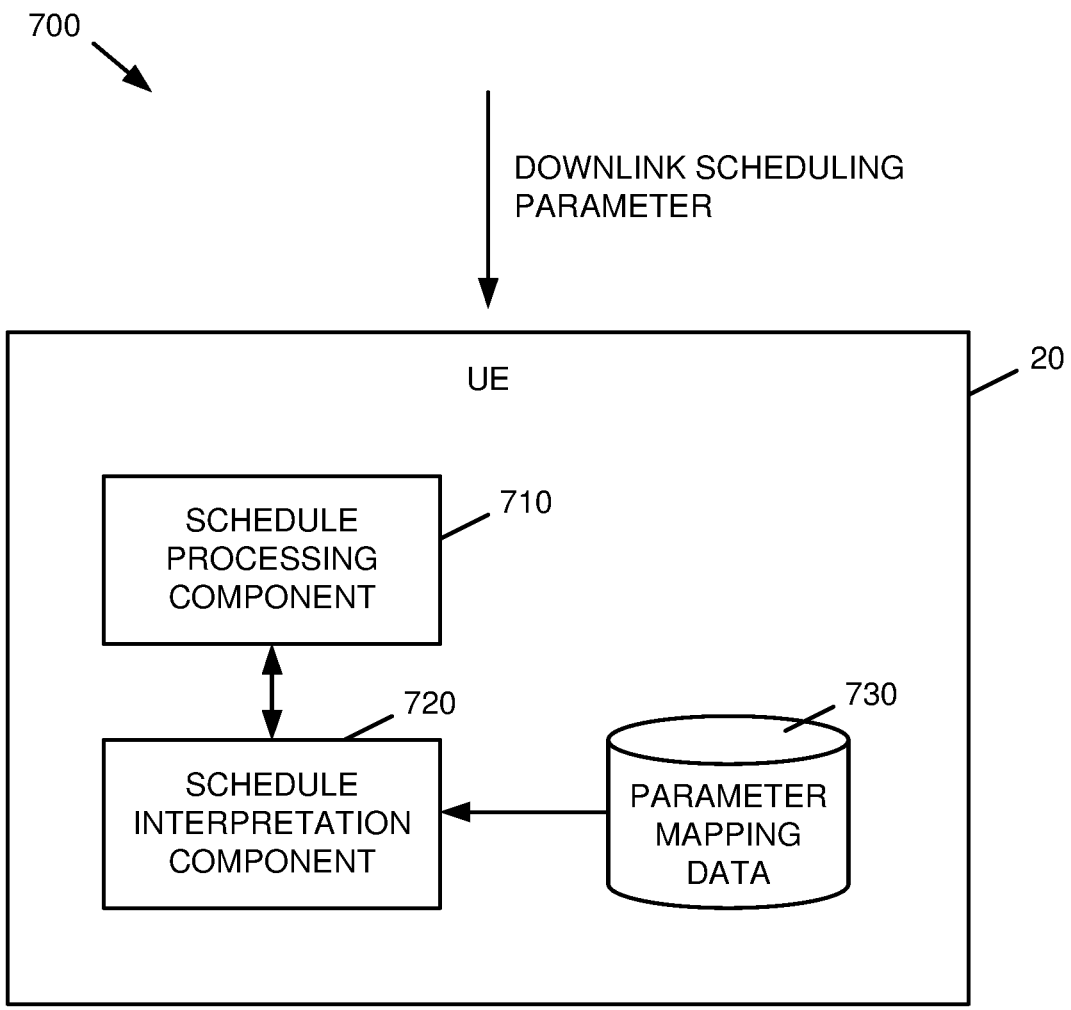
FIG. 7 is a block diagram of a system that facilitates interpretation of scheduling parameters transmitted via a downlink control channel in accordance with various aspects described herein.

With reference now to FIG. 7, a block diagram of a system 700 that facilitates interpretation of scheduling parameters transmitted via a downlink control channel in accordance with various aspects described herein is illustrated. Repetitive description of like elements employed in other embodiments described herein is omitted for sake of brevity. System 700 as shown in FIG. 7 includes a UE 20, which can receive one or more scheduling parameters via a message transmitted (e.g., by the network device 10 shown in FIG. 1) via a downlink control channel.

In an aspect, a schedule processing component 710 associated with the UE 20 (e.g., as implemented by the processor 24 executing instructions stored on the memory 26) can determine whether the scheduling parameter(s) received via the downlink control channel is associated with a self-decodable transport block or a non-self-decodable transport block. For instance, if the scheduling parameters received by the UE 20 include an MCS and an RV as described above, the schedule processing component 710 can classify a transport block associated with the scheduling parameters as non-self-decodable if a code rate associated with the MCS is higher than a self-decodability code rate threshold for the RV (e.g., the rate thresholds described above with respect to RV1 and/or RV2). In another example where the scheduling parameters include an MCS, an RV, and an NDI, the schedule processing component 710 can classify a transport block associated with the scheduling parameters as non-self-decodable if a self-decodability code rate threshold for the RV is exceeded as described above and the NDI indicates a beginning of a data transmission (e.g., an original transmission or a retransmission).

In response to determining that the received scheduling parameter(s) indicates and/or is otherwise associated with a non-self-decodable transport block, a schedule interpretation component 720 at the UE 20 can interpret and/or otherwise identify the scheduling parameter(s) as information distinct from scheduling information for the non-self-decodable transport block. Stated another way, if information provided in scheduling parameter fields(s) of a control channel message are determined by the schedule processing component 710 as indicating a non-self-decodable transport block, the schedule interpretation component 720 can interpret those fields as carrying information other than that corresponding to the scheduling parameter fields in which they were provided. By way of specific, non-limiting example, information that can be conveyed via scheduling parameters in this manner can include transmission rank information, information pertaining to the number of codewords in an associated data transmission, on-demand CSI, interference information, and/or any other useful information for the UE 20.

In an aspect, the schedule interpretation component 720 can identify the non-scheduling information being carried by the downlink control channel message according to a set of parameter mapping data 730. The parameter mapping data 730 can, in turn, correspond to a defined mapping from respective scheduling parameters, e.g., MCS, RV, NDI, etc., to the non-scheduling information.

Figure 8:
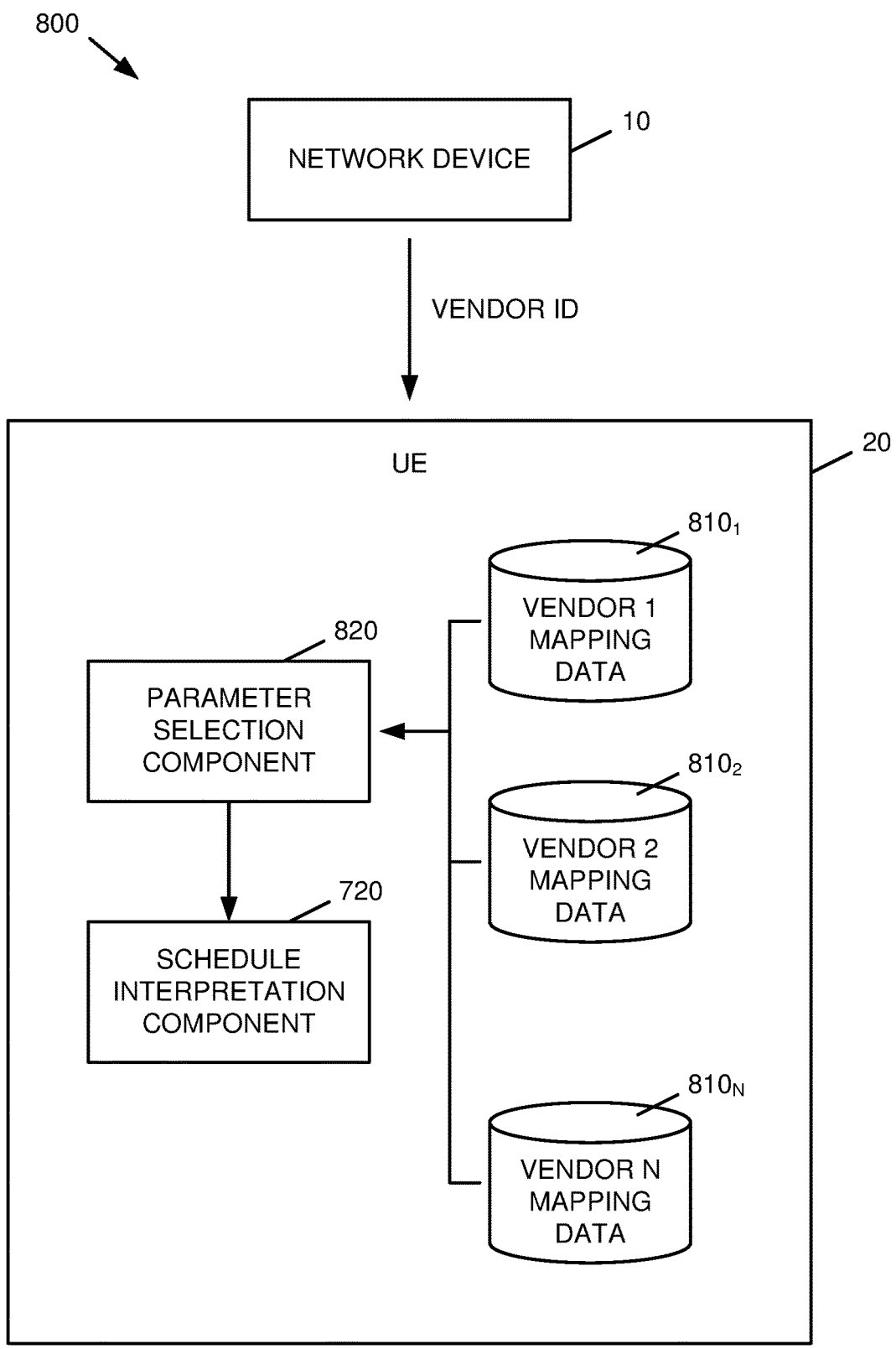
FIG. 8 is a block diagram of a system that facilitates identification of a scheduling parameter mapping in accordance with various aspects described herein.

In one example, the parameter mapping data 730 can be universal among devices in system 700, e.g., by establishing the parameter mapping data 730 as part of a communication standard for system 700 and/or by other means. Alternatively, the parameter mapping data 730 can differ among devices and/or device vendors. For instance, as shown by system 800 in FIG. 8, a UE 20 can be associated with multiple sets of mapping data 810 that correspond to different vendor identities, device identities, or the like.

In an aspect, a network device 10 and/or another suitable source of scheduling parameters can provide its identity and/or information relating to its identity (e.g., vendor identification, model name, etc.) to the UE 20 either during a transmission of scheduling parameters or prior to such a transmission, e.g., at initialization/power-on of the UE 20, initialization of the network device 10, a handoff of coverage for the UE 20 from a prior network. In response to this indication, a parameter selection component 820 at the UE 20 can select an appropriate set of mapping data 810 based on the identity of the source of the indication. As a result, any subsequent scheduling parameters transmitted by the same network device 10 can be interpreted by the schedule interpretation component 720 based on a mapping as defined and/or otherwise selected based on the identity of the source of the scheduling parameter.

Figure 9:
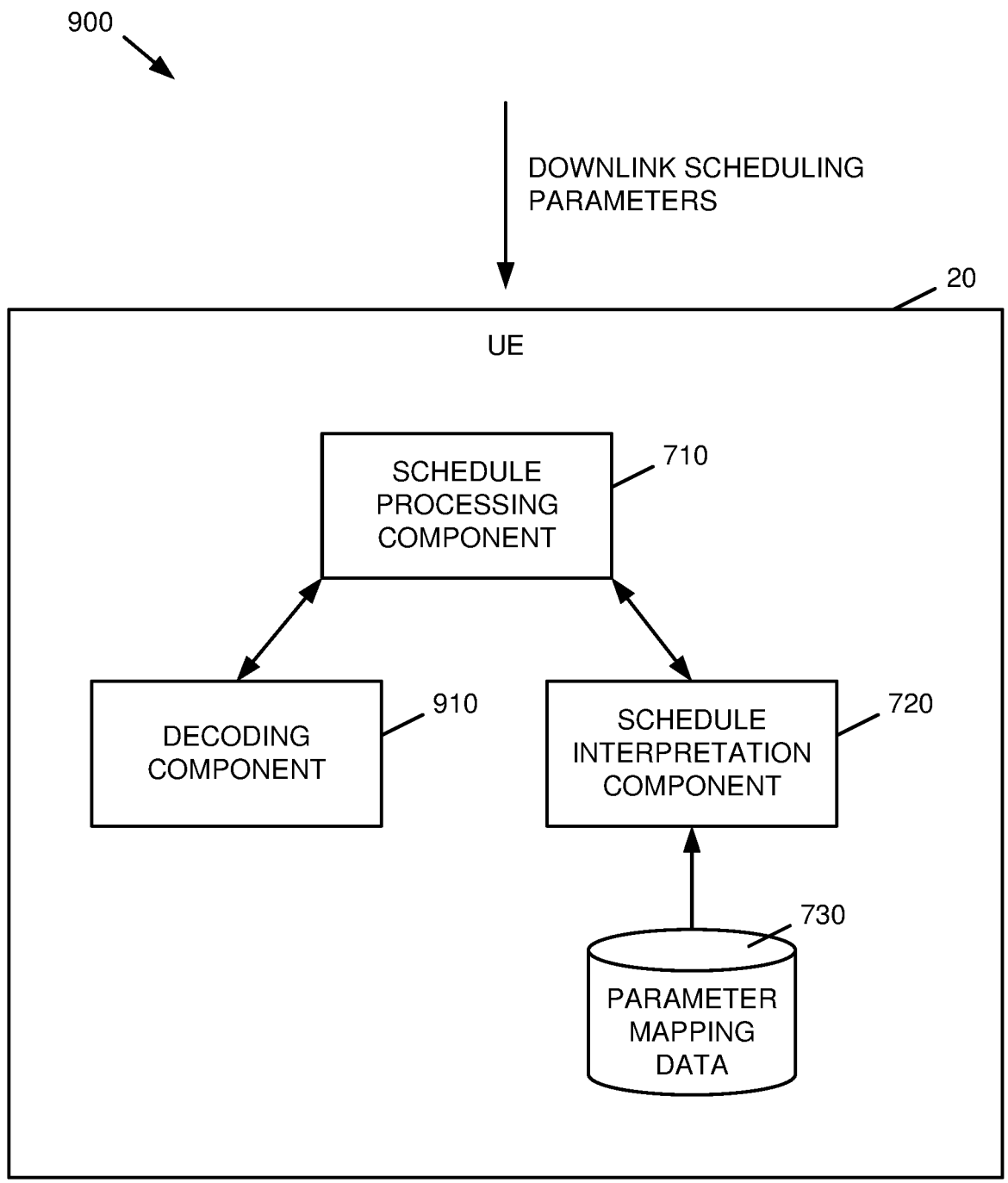
FIG. 9 is a block diagram of a system that facilitates processing scheduling parameters for both self-decodable and non-self-decodable transport blocks in accordance with various aspects described herein.

Turning next to FIG. 9, a block diagram of a system 900 that facilitates processing scheduling parameters for both self-decodable and non-self-decodable transport blocks in accordance with various aspects described herein is illustrated. Repetitive description of like elements employed in other embodiments described herein is omitted for sake of brevity. System 900 as shown by FIG. 9 includes a UE 20, which can receive scheduling parameters via a message transmitted (e.g., by a network device 10) over a downlink control channel. In an aspect, scheduling parameters transmitted over the downlink control channel can include scheduling parameters for both self-decodable and non-self-decodable transport blocks. For instance, scheduling parameters received by the UE 20 can include a first scheduling parameter for a first codeword and a second scheduling parameter for a second codeword. If one of the scheduling parameters, e.g., the first scheduling parameter, is associated with a non-self-decodable transport block, the schedule processing component 710 and schedule interpretation component 720 can identify the scheduling parameter as non-scheduling data according to various aspects as described above, e.g., with respect to FIG. 7. Alternatively, if one of the scheduling parameters, e.g., the second scheduling parameter, is associated with a self-decodable transport block, the schedule processing component 710 can provide the scheduling parameter to a decoding component 910 to decode the transport block in accordance with various techniques known in the art.

In an aspect, non-scheduling information obtained via a scheduling parameter for a non-self-decodable transport block can be utilized in identify and/or decoding subsequent transport blocks. For instance, in the example given above relating to scheduling parameters for two respective codewords, the first scheduling parameter can be utilized to indicate the presence of the second codeword and/or to provide further information to assist in decoding or otherwise processing the second codeword.

Figure 10:
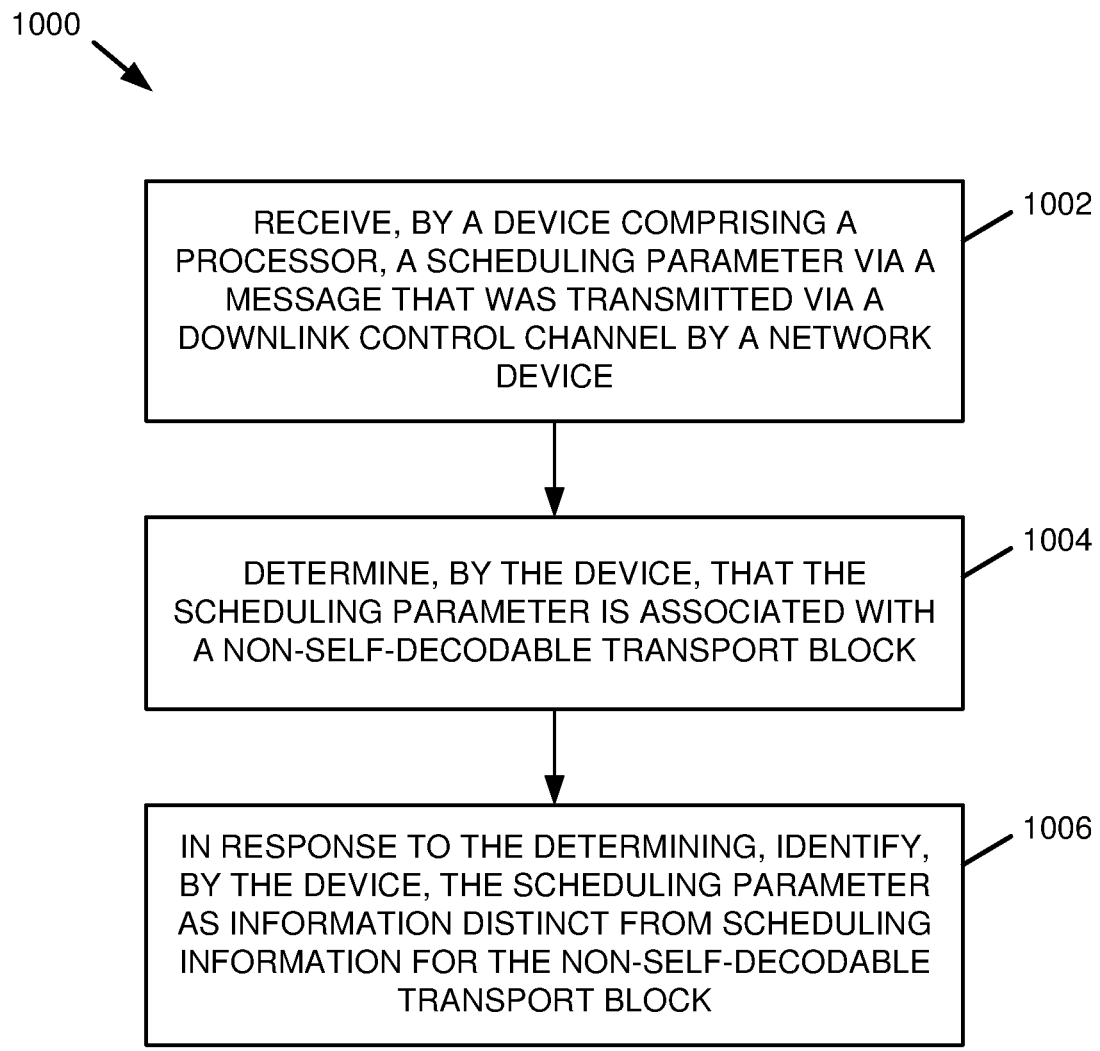
FIGS. 10-11 are flow diagrams of respective methods for indicating additional information in a wireless communication system via a legacy downlink control channel in accordance with various aspects described herein.
Figure 11:
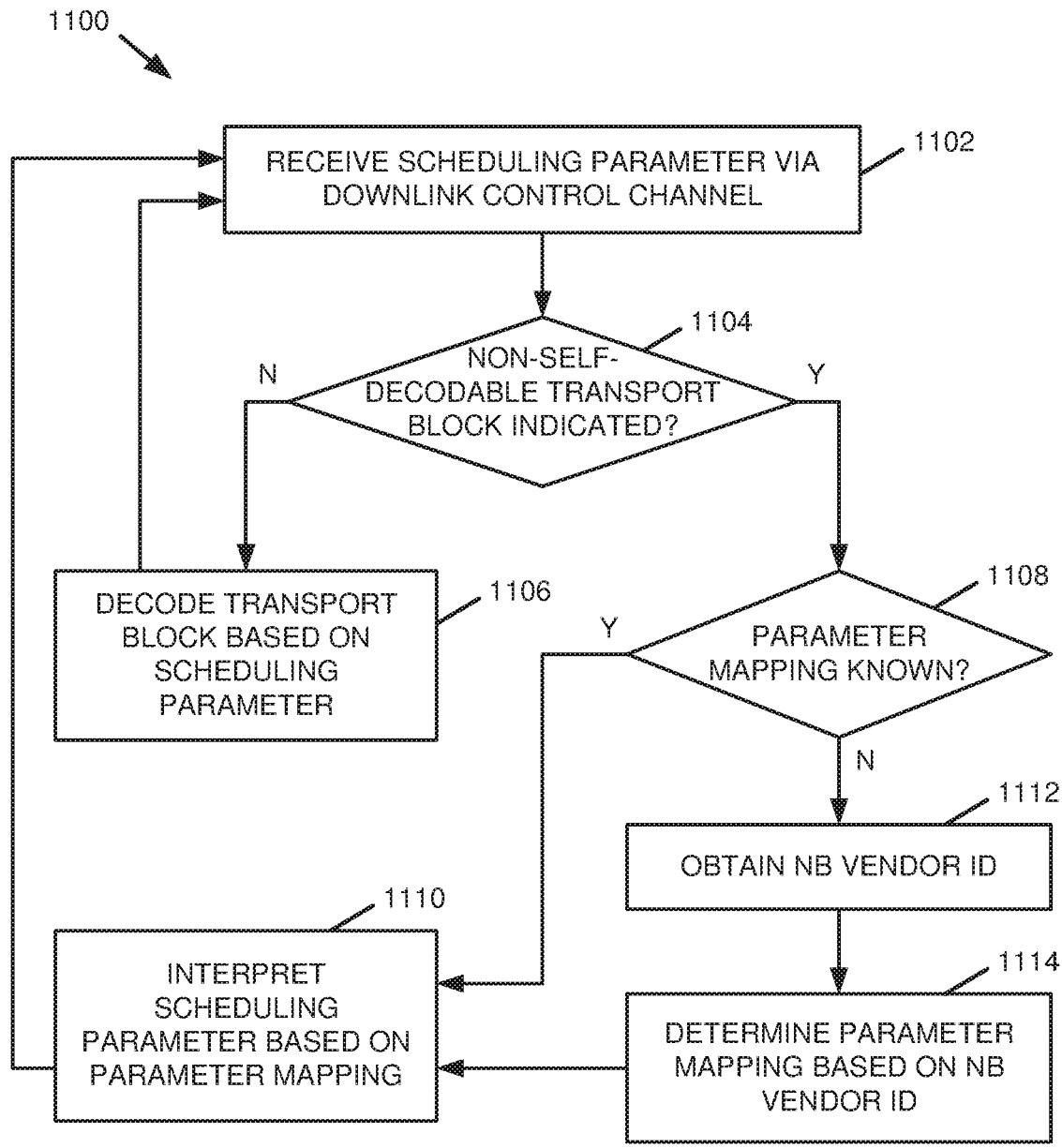

FIGS. 10-11 illustrate respective methods in accordance with certain aspects of this disclosure. While, for purposes of simplicity of explanation, the methods are shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

With reference to FIG. 10, a flow diagram of a method 1000 for indicating additional information in a wireless communication system, e.g., a 5G system, via a legacy control channel is presented. At 1002, a device comprising a processor (e.g., a UE 20 comprising a processor 24) can receive (e.g., via a transceiver 22) a scheduling parameter via a message that was transmitted over a downlink control channel by a network device (e.g., network device 10).

At 1004, the device can determine (e.g., by a schedule processing component 710 and/or other components implemented by the processor 24) that the scheduling parameter received at 1002 is associated with a non-self-decodable transport block.

At 1006, in response to the determining at 1004, the device can identify (e.g., by a schedule interpretation component 720 and/or other components implemented by the processor 24) the scheduling parameter received at 1002 as information distinct from scheduling information for the non-self-decodable transport block, e.g., based on associated parameter mapping data 730.

Turning to FIG. 11, a flow diagram of another method 1100 for indicating additional information in a wireless communication system, e.g., a 5G system, via a legacy control channel is presented. While not shown in FIG. 11 for brevity of illustration, it should be appreciated that each action of method 1100 as described below can be performed by a device comprising a processor (e.g., a UE 20 comprising a processor 24) in a similar manner to method 1000 above.

At 1102, a scheduling parameter can be received (e.g., by a transceiver 22 of a UE 20) over a downlink control channel. At 1104, a determination can be made (e.g., via a schedule processing component 710) regarding whether the scheduling parameter received at 1102 indicates and/or is otherwise associated with a non-self-decodable transport block. If the scheduling parameter is not associated with a non-self-decodable transport block, i.e., the scheduling parameter is associated with a self-decodable transport block, method 1100 can continue to 1106, in which the transport block corresponding to the scheduling parameter is decoded (e.g., by a decoding component 910) based on the received scheduling parameter. Method 1100 can then return to 1102 for processing of subsequent scheduling parameters.

Alternatively, if the scheduling parameter is determined to be associated with a non-self-decodable transport block at 1104, the scheduling parameter received at 1102 can be interpreted as non-scheduling information. Accordingly, method 1100 can proceed to 1108 to determine whether a parameter mapping (e.g., parameter mapping data 730) between the scheduling parameter and its corresponding information is known. If the mapping is known, method 1100 can proceed to 1110, in which the scheduling parameter is interpreted (e.g., by a schedule interpretation component 720) based on the parameter mapping data. Method 1100 can then return to 1102 for any further scheduling parameters.

If the parameter mapping is not known at 1108, method 1100 can instead proceed to 1112, in which an NB vendor identifier and/or other identifying data relating to the source of the scheduling parameter received at 1102 can be obtained. Based on this identifying information, an appropriate parameter mapping can be selected or otherwise determined (e.g., by a parameter selection component 820) at 1114. Method 1100 can then proceed to 1110 to process the scheduling parameter based on the mapping determined at 1114, and ultimately return to 1102 to process further scheduling parameters.

Figure 12:
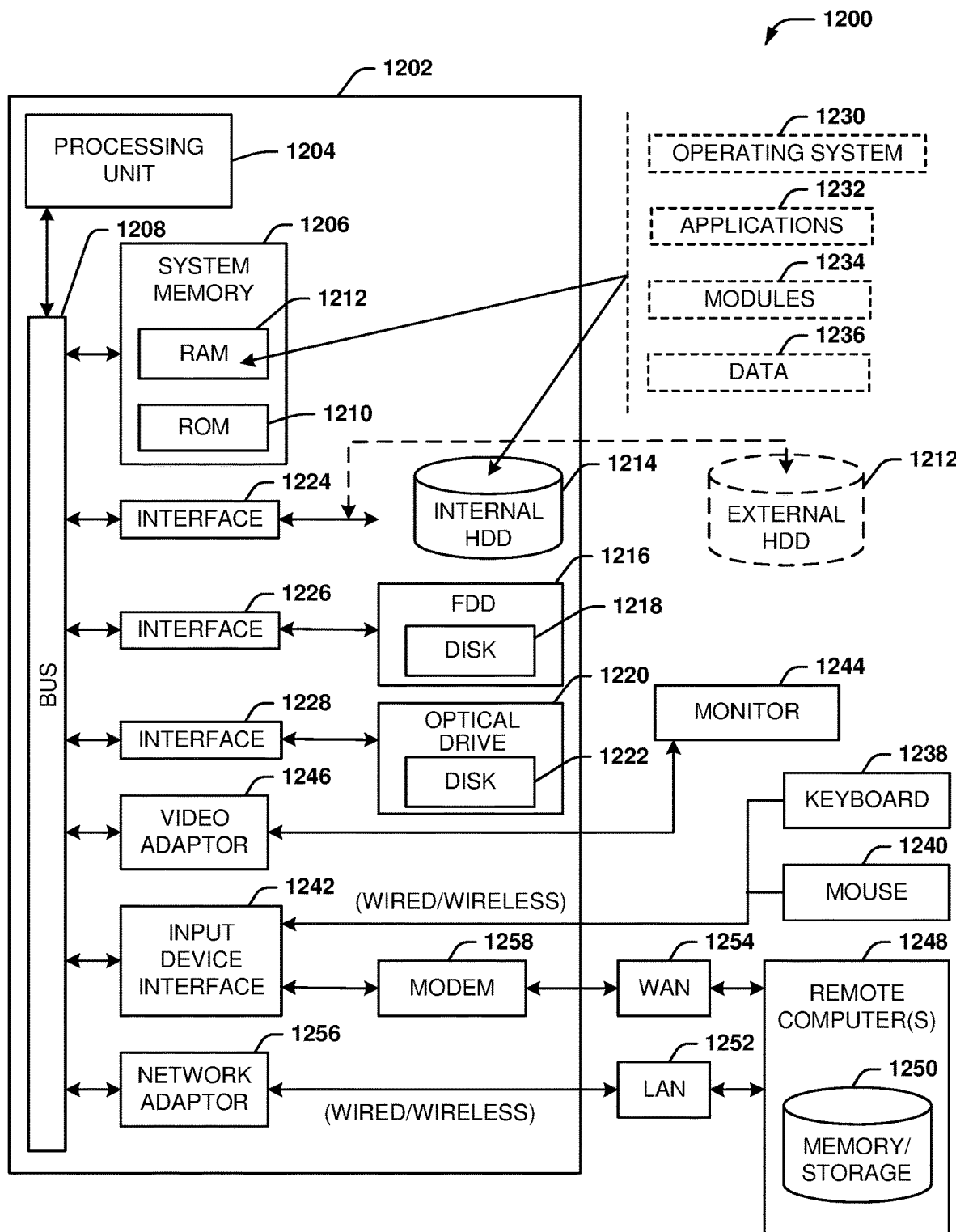
FIG. 12 depicts an example computing environment in which various embodiments described herein can function.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). While the internal HDD 1214 is illustrated as located within the computer 1202, the internal HDD 1214 can also be configured for external use in a suitable chassis (not shown). The HDD 1214, magnetic FDD 1216 and optical disk drive 1220 can be connected to the system bus 1208 by an HDD interface 1224, a magnetic disk drive interface 1226 and an optical drive interface 1228, respectively. The interface 1224 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a USB port, an IR interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless access point (AP) disposed thereon for communicating with the wireless adapter 1256.

When used in a WAN networking environment, the computer 1202 can include a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies.

Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by a device comprising a processor, a scheduling parameter via a message that was transmitted via a downlink control channel by a network device;
    determining, by the device, that the scheduling parameter is associated with a non-self-decodable transport block; and
    in response to the determining, identifying, by the device, the scheduling parameter as information distinct from scheduling information for the non-self-decodable transport block.

2. The method of claim 1, wherein the receiving the scheduling parameter comprises receiving scheduling parameters, comprising the scheduling parameter, wherein the scheduling parameters comprise a modulation and coding scheme and a redundancy version, and wherein the determining comprises:
    determining that a code rate associated with the modulation and coding scheme is higher than a self-decodability code rate threshold for the redundancy version.

3. The method of claim 2, wherein the identifying comprises:
    identifying the information according to a defined mapping from the modulation and coding scheme and the redundancy version to the information.

4. The method of claim 2, wherein the scheduling parameters further comprise a new data indicator, and wherein the determining further comprises:
    determining that the new data indicator indicates a beginning of a data transmission.

5. The method of claim 1, wherein the receiving comprises:
    receiving an identity of a source of the scheduling parameter; and
    determining the scheduling parameter based on the identity of the source of the scheduling parameter.

6. The method of claim 5, wherein the identifying comprises:
defining a mapping between the scheduling parameter and the information based on the identity of the source of the scheduling parameter; and
identifying the information according to the mapping.

7. The method of claim 1, wherein the receiving the scheduling parameter comprises receiving a first scheduling parameter for a first codeword and a second scheduling parameter for a second codeword, and wherein the method further comprises:
decoding, by the device, the second codeword according to the second scheduling parameter in response to determining that the second scheduling parameter is associated with a self-decodable transport block.

8. The method of claim 7, wherein the identifying comprises identifying a presence of the second codeword via the first scheduling parameter.

9. The method of claim 1, wherein the identifying comprises identifying the scheduling parameter as at least one of a transmission rank parameter, channel state information, or interference information.

10. A system, comprising:
a processor; and
a memory that stores executable instructions that, when executed by the processor, facilitate performance of operations, the operations comprising:
receiving a scheduling parameter via a message that was transmitted via a downlink control channel by a network device;
determining that the scheduling parameter is associated with a non-self-decodable transport block; and
in response to the determining, identifying the scheduling parameter as information other than scheduling information for the non-self-decodable transport block.

11. The system of claim 10, wherein the operations further comprise:
receiving scheduling parameters, comprising the scheduling parameter, wherein the scheduling parameters comprise a modulation and coding scheme and a redundancy version; and
determining that a code rate associated with the modulation and coding scheme is higher than a self-decodability code rate threshold for the redundancy version.

12. The system of claim 11, wherein the operations further comprise:
identifying the information according to a defined mapping from the modulation and coding scheme and the redundancy version to the information.

13. The system of claim 11, wherein the scheduling parameters further comprise a new data indicator, and wherein the operations further comprise:
determining that the new data indicator indicates a beginning of a data transmission.

14. The system of claim 10, wherein the operations further comprise:
receiving an identity of a source of the scheduling parameter; and
determining the scheduling parameter based on the identity of the source of the scheduling parameter.

15. The system of claim 14, wherein the operations further comprise:
defining a mapping between the scheduling parameter and the information based on the identity of the source of the scheduling parameter; and
identifying the information according to the mapping.

16. The system of claim 10, wherein the operations further comprise:
identifying the scheduling parameter as at least one of a transmission rank parameter, channel state information, or interference information.

17. A non-transitory machine-readable medium, comprising executable instructions that, when executed by a processor, facilitate performance of operations, comprising:
receiving a scheduling parameter via a message that was transmitted via a downlink control channel by a network device; and
in response to determining that the scheduling parameter is associated with a non-self-decodable transport block, identifying the scheduling parameter as information that is not scheduling information for the non-self-decodable transport block.

18. The non-transitory machine-readable medium of claim 17, wherein the operations further comprise:
receiving scheduling parameters, comprising the scheduling parameter, wherein the scheduling parameters comprise a modulation and coding scheme and a redundancy version; and
determining that a code rate associated with the modulation and coding scheme is higher than a self-decodability code rate threshold for the redundancy version.

19. The non-transitory machine-readable medium of claim 18, wherein the operations further comprise:
identifying the information according to a defined mapping from the modulation and coding scheme and the redundancy version to the information.

20. The non-transitory machine-readable medium of claim 18, wherein the scheduling parameters further comprise a new data indicator, and wherein the operations further comprise:
determining that the new data indicator indicates a beginning of a data transmission.

* * * * *